United States Patent
Dougherty et al.

(10) Patent No.: US 6,837,550 B2
(45) Date of Patent: Jan. 4, 2005

(54) BRAKE SYSTEM DIAGNOSTIC USING A HAND-HELD RADIO DEVICE

(75) Inventors: Bryan Alvin Dougherty, Melbourne, FL (US); Donnie Horace Herndon, Melbourne, FL (US)

(73) Assignee: GE Harris Railway Electronics, LLC, Melbourne, FL (US)

( * ) Notice: Subject to any disclaimer, the term of this patent is extended or adjusted under 35 U.S.C. 154(b) by 58 days.

(21) Appl. No.: 10/034,332

(22) Filed: Dec. 28, 2001

(65) Prior Publication Data

US 2002/0111726 A1 Aug. 15, 2002

Related U.S. Application Data

(60) Provisional application No. 60/258,664, filed on Dec. 29, 2000.

(51) Int. Cl.⁷ .............................................. B60T 15/14
(52) U.S. Cl. ................................ 303/3; 303/7; 303/20; 303/124; 73/39; 73/121
(58) Field of Search ............................ 303/20, 3.15, 7, 303/124; 73/39, 121; 246/186

(56) References Cited

U.S. PATENT DOCUMENTS

| | | | |
|---|---|---|---|
| 3,937,074 A | | 2/1976 | Burkett |
| 4,066,299 A | * | 1/1978 | Clements ..................... 303/20 |
| 4,652,057 A | | 3/1987 | Engle et al. |
| 4,847,770 A | | 7/1989 | Kane et al. |
| 5,039,038 A | * | 8/1991 | Nichols et al. ................ 246/3 |
| 5,503,011 A | | 4/1996 | Hart et al. |
| 5,509,727 A | | 4/1996 | Hart et al. |
| 5,559,281 A | | 9/1996 | McKay et al. |
| 5,592,384 A | | 1/1997 | Wolf |
| 5,695,258 A | | 12/1997 | Reid et al. |
| 5,701,974 A | | 12/1997 | Kanjo et al. |
| 5,709,436 A | | 1/1998 | Scott |
| 5,714,684 A | | 2/1998 | Gaughan |
| 5,747,685 A | | 5/1998 | Skantar |
| 5,817,934 A | | 10/1998 | Skantar |
| 5,866,811 A | | 2/1999 | Skantar |
| 5,898,102 A | | 4/1999 | Skantar |
| 6,014,600 A | | 1/2000 | Ferri et al. |
| 6,094,977 A | | 8/2000 | Vaughn |
| 6,158,821 A | | 12/2000 | Kushnir, Jr. et al. |
| 6,186,600 B1 | | 2/2001 | Scott et al. |
| 6,227,625 B1 | | 5/2001 | Gaughan |
| 6,246,950 B1 | * | 6/2001 | Bessler et al. ................. 701/99 |
| 6,364,432 B1 | * | 4/2002 | Mixon ......................... 303/124 |
| 6,375,276 B1 | * | 4/2002 | Delaruelle ...................... 303/7 |

* cited by examiner

*Primary Examiner*—Matthew C. Graham
(74) *Attorney, Agent, or Firm*—Armstrong Teasdale LLP

(57) ABSTRACT

A method for diagnosing a braking system using a system including a radio-based hand-held analyzer, at least one radio-based feed valve, and at least one mobile data unit. The braking system includes at least one brake pipe section, a reservoir, and at least one brake cylinder. The brake pipe section connects to the reservoir, the brake cylinder, and the radio-based feed valve. The hand-held radio-based analyzer communicates with the mobile data unit and the radio-based feed valve. The method includes retrieving brake system data and information using the hand-held analyzer, interpreting the retrieved data and information, and performing maintenance functions based on the interpretation of the data and information.

22 Claims, 2 Drawing Sheets

BRAKE SYSTEM DIAGNOSTIC USING A HAND-HELD RADIO DEVICE

CROSS REFERENCE TO RELATED APPLICATIONS

This application claims the benefit of U.S. Provisional Application No. 60/258,664 filed Dec. 29, 2000, which is hereby incorporated by reference in its entirety.

BACKGROUND OF THE INVENTION

This invention relates generally to train braking systems, and more particularly to evaluating the operational status of brakes on an individual railcar.

A train consist typically includes a lead locomotive and one or more remote locomotives, and railcars, comprehensively referred to as rolling stock. Each piece of rolling stock has braking equipment including, among other components, a section of brake pipe, a feed valve, and a brake cylinder. The brake pipe sections are connected forming a brake pipe that extends the length of the consist. When the feed valve of a brake pipe section is cut-in air pressure in the brake pipe is increased disengaging the brakes, and when the feed valve is cutout air is released or exhausted from the brake pipe and the brakes engage. To apply train brakes the brake pipe pressure decreases at a specified rate, which determines the percentage of brake applied.

Proper functioning of the braking system for each piece of rolling stock in a train consist is important in maintaining safe and efficient operation of the consist. Improper functioning of braking equipment in a train consist may cause loss of efficiency, for example, excessive fuel consumption and increased wear on wheels and brake shoes. Additionally, improper brake functioning can create unsafe conditions, such as high in-train forces and increased risk of train separations when all braking equipment is not working simultaneously. Thus, regular brake equipment testing, diagnostics and maintenance are required.

At present, to test the brake system of a piece of rolling stock, the individual piece of rolling stock is removed from the train consist and pneumatic test equipment is connected to the rolling stock. Therefore, to isolate a failed brake system component, or verify the braking system is operable, each piece of rolling stock in the train consist must be disconnected, tested, repaired if necessary, and reconnected to a train consist. Furthermore, presently there is not an efficient way to forward information reports containing information, such as consist condition and disposition, to a central location where owners of the rolling stock can obtain pertinent information.

BRIEF DESCRIPTION OF THE INVENTION

In one aspect, a method is provided for diagnosing a braking system using a system including a radio-based hand-held analyzer, at least one radio-based feed valve, and at least one mobile data unit. The braking system includes at least one brake pipe section, a reservoir, and at least one brake cylinder. The brake pipe section connects to the reservoir, the brake cylinder, and the radio-based feed valve. The hand-held radio-based analyzer communicates with the mobile data unit and the radio-based feed valve. The method includes retrieving brake system data and information using the hand-held analyzer, interpreting the retrieved data and information, and performing maintenance functions based on the interpretation of the data and information.

In another aspect, a system is provided for diagnosing a braking equipment, wherein the braking equipment includes at least one brake pipe section connected to a reservoir and at least one brake cylinder. The system includes a radio-based hand-held analyzer, at least one radio-based feed valve connected to the brake pipe section and configured to communicate with the hand-held analyzer, and at least one mobile unit configured to communicate with the hand-held analyzer.

In a further aspect, a hand-held analyzer is provided for testing and diagnosing a brake system including a radio-based feed valve. The hand-held analyzer includes an antenna for communicating with the feed valve, a user interface for inputting data and commands to be communicated to the feed valve, and a display for viewing data received from the feed valve. The hand-held analyzer is configured to utilize said user interface to input a command to query the feed valve for brake system data indicative of an operational state of the brake system, transmit the query to the feed valve utilizing the antenna, receive the brake system data indicative of an operational state of the brake system utilizing the antenna, and display the brake system data on the display.

DETAILED DESCRIPTION OF THE INVENTION

Figure 1:
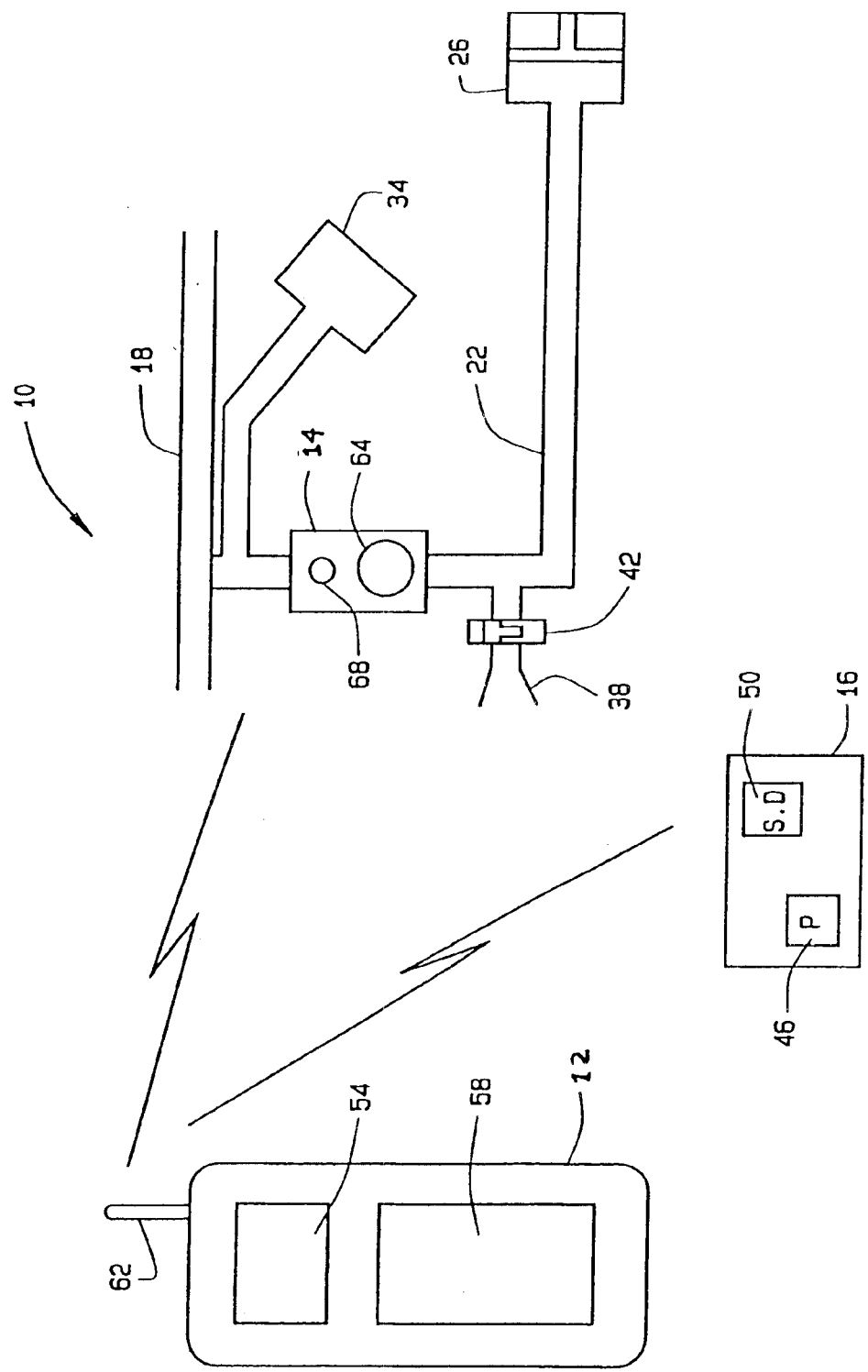
FIG. 1 is a schematic of a system for testing and analyzing brake equipment in accordance with one embodiment of the present invention.

FIG. 1 is a schematic of a system 10 for testing and diagnosing braking equipment of a train consist (not shown). System 10 includes a radio-based hand-held brake analyzer 12, at least one radio-based feed valve 14, at least one mobile data unit 16, and a brake pipe 18 extending along the consist. Brake pipe 18 includes a plurality of brake pipe sections 22 for supplying and venting air during operation of at least one brake cylinder 26. Brake pipe sections 22 are connected by trainline hoses (not shown) to form brake pipe 18. Each locomotive and railcar in the train consist includes a respective brake pipe section 22 connected to brake cylinder 26, and a reservoir 34 for storing compressed air used during operation of brake cylinder 26. Additionally, each brake pipe section 22 is connected to radio-based feed valve 14, which controls the flow of air in the respective brake pipe section 22, thereby controlling air pressure in brake cylinder 26 and a respective reservoir 34. Furthermore, system 10 includes an exhaust 38 connected to brake pipe section 22 for exhausting air from brake pipe section 22. Exhaust 38 includes an exhaust valve 42 for controlling the flow of air through exhaust 38. Mobile data unit 16 includes a processor 46 for executing all functions of data unit 16 and an electronic storage device 50 for storing information, programs and data. Hand-held analyzer 12 includes a display 54 for displaying information and data, a user interface 58 for inputting data and commands, and an antenna 62.

In one embodiment, radio-based feed valve 14 includes a sensor 64 and a processor 68. Sensor 64 senses and measures pressure in brake pipe 18, pressure in brake pipe section 22, reservoir 34, and pressure in brake cylinder 26. Processor 68 processes the pressure measurements, compiles brake system data, and communicates, via a radio frequency, with hand-held analyzer 12. More specifically, in addition to controlling the air flow in brake pipe section 22, feed valve 14 monitors pressures in the braking system of an individual piece of rolling stock indicative of the operational state of the braking system, i.e. brake pipe section 22, brake cylinder 26 and reservoir 34.

A user, such as a brakeman, utilizes hand-held analyzer 12 to test and diagnose the functional state of the braking system without disconnecting the piece of rolling stock from the train consist. Hand-held analyzer 12 communicates with valve 14 via radio communications. Using interface 58, a user enters an identification number specific to the piece of rolling stock braking system to be tested, then enters commands, and data to query valve 14 for brake system data, such various component pressures, and to test the brake system. In response to the query, valve 14 communicates pressure measurements of brake system components, such as brake pipe section 22, brake cylinder 26 and reservoir 34, to hand-held analyzer 12. The information and data received from valve 14 is displayed on display 54 for viewing by the user, and used to diagnosis the operational state of the braking system of the piece of rolling stock. Based on the diagnosis, the user determines whether or not repairs are needed and the appropriate maintenance procedures necessary to implement any needed repairs. For example, nearby pieces of rolling stock should have similar pressure readings, therefore if pressure readings from a piece of rolling stock vary from the pressure reading of nearby pieces of rolling stock, the user can quickly isolate a leaky brake system component such as cylinder 26, reservoir 34, and brake cylinder 26. Once a leaky component is isolated, the user can implement maintenance procedures to correct the faulty component, such as removing the piece of rolling stock from the consist to a side track for repair and reconnecting the rolling stock once repairs are completed.

In another embodiment, feed valve 14 monitors pressure changes in brake system components, such as brake pipe section 22, brake cylinder 26, and reservoir 34. A user then utilizes held analyzer 12 to query valve 14 for information pertaining to changes in pressure that exceed a specified range. If pressure fluctuations in the brake system exceed the specified range, the user analyzes the information and initiates proper adjustments or repairs.

In yet another embodiment hand-held analyzer 12 includes a processor (not shown) and an electronic memory module (not shown). Via radio communications with feed valve 14 and operation of user interface 58, hand-held analyzer 12 receives and stores brake system data inputs and other general information inputs, such as an employee identification, an identification number for a specific piece of rolling stock, and the related failure conditions, tests performed on the braking system, type of repairs needed, type of repairs performed in the past, a billing code, sided location. Processor processes and compiles this data and information, which is then stored in memory module. At a later time the information and data stored in memory module is downloaded to mobile data unit 16 using a communications link, such as the Internet, radio frequency, direct wire communications, and direct optical communications. In an alternate embodiment, mobile data unit 16 broadcasts the information and data over a local communications backbone, such as a local area network (LAN), or a wide area network (WAN), which is then posted to a password protected web page.

Figure 2:
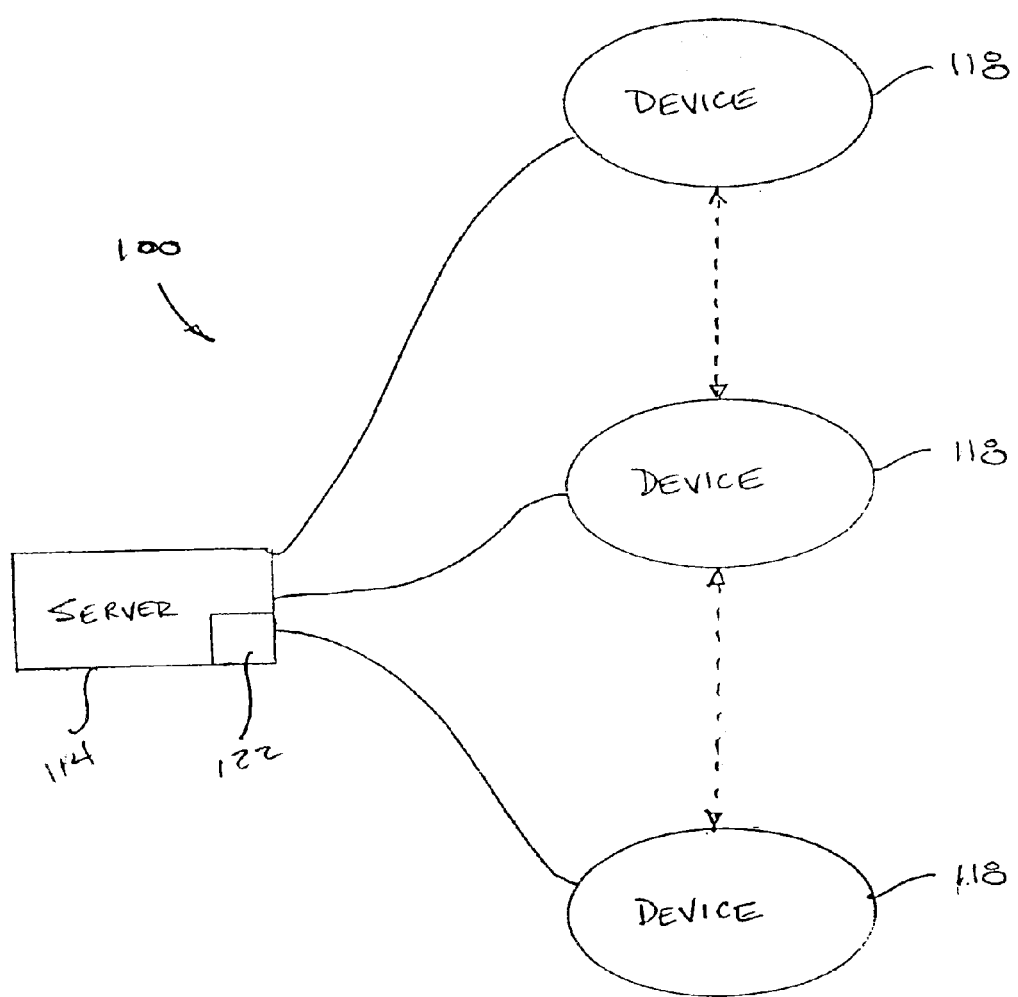
FIG. 2 is a schematic of a server system for testing and analyzing brake equipment, used in conjunction with the system shown in FIG. 1.

FIG. 2 is a schematic of a server system 100 for testing and diagnosing the operational state of braking equipment, used in conjunction with system 10 (shown in FIG. 1). In an alternate embodiment, mobile data unit 16 (shown in FIG. 1) is part of a computer network accessible using the Internet. Server system 100 is an automated system that includes a server 114 and a plurality of client systems 118 connected to server 114. In one embodiment, client systems 118 includes a computer (not shown), such as mobile data unit 16 (shown in FIG. 1), including a web server, a central processing unit (CPU), a random access memory (RAM), an output device, for example a monitor, a mass storage device, and an input device, for example a keyboard or a mouse. In an alternative embodiment, client systems 118 are servers for a network of customer devices.

Server 114 is accessible to client systems 118 via the Internet. Client systems 118 are interconnected to server 114 through many interfaces including dial-in-connections, cable modems, special high-speed ISDN lines, and networks, such as local area networks (LANs) or wide area networks (WANs). In one embodiment, client systems 118 includes any client system capable of interconnecting to the Internet including a web-based phone or other web-based movable equipment. Server 114 is also connected to mass storage device 122. Mass storage device 122 is accessible by potential users through client systems 118.

The braking system of a specific piece of rolling stock is tested and diagnosed while it remains connected to the train consist using the hand-held analyzer. The hand-held analyzer communicates with the radio-based feed valve, transmitting queries pertaining to the functional status of the braking system of the piece of rolling stock. The radio-based feed valve monitors air pressure in brake system components of the piece of rolling stock, such as the brake pipe sections, the brake cylinder, and the reservoir, communicates the information to the radio-based hand-held analyzer. Therefore, the functional state of the braking system of an individual piece of rolling stock can be tested and diagnosed without the added time and expense of disconnecting the rolling stock from the train consist.

While the invention has been described in terms of various specific embodiments, those skilled in the art will recognize that the invention can be practiced with modification within the spirit and scope of the claims.

What is claimed is:

1. A method for monitoring and diagnosing a condition of a braking system for a railroad train comprising a plurality of rolling stock vehicles, the braking system including a brake pipe extending the length of the train, with a portion of the braking system being associated with each rolling stock vehicle, such portion comprising at least one brake pipe section, one reservoir for air under pressure, at least one brake cylinder,-powered by air in the reservoir, and a feed valve for controlling the flow of air from the reservoir into the brake cylinder on each rolling stock vehicle, and the feed valve on a plurality of rolling stock vehicles having a radio-based transmitter/receiver, receiving data indicative of the operation of a respective portion of the brake system, for transmitting data indicative of the operation of the respective portion of the braking system associated with each rolling stock vehicle, said method comprising:

providing a radio-based hand-held transmitter/receiver having a processor for analyzing data;

retrieving brake system data and information from each feed valve transmitter/receiver on the train through radio communications between each feed valve transmitter/receiver and the hand-held radio transmitter/receiver using a hand-held analyzer;

interpreting the retrieved data pertaining to a functional status of the portion of the braking system associated with each rolling stock vehicle; and performing a maintenance function on the brake system for the train based on the interpretation of the data for the portion of the brake system for each rolling stock vehicle.

2. A method in accordance with claim 1 wherein the feed valve includes a sensor for sensing air pressure in the brake pipe section, and a first processor for processing data, retrieving brake system data comprising:

utilizing the sensor to measure air pressure in the brake pipe section; and utilizing the first processor to compile brake system data indicative of an operational state of at least one of the brake pipe section, the reservoir and the brake cylinder, based on the measured air pressure.

3. A method in accordance with claim 2 wherein the hand-held analyzer includes a user interface for inputting data and commands to the hand-held analyzer, retrieving brake system data further comprising:

utilizing the user interface to allow a user to create a command to query the feed valve; and communicating the query to the feed valve using the hand-held analyzer.

4. A method in accordance with claim 3 wherein retrieving brake system data further comprises communicating brake system data from the feed valve to the hand-held analyzer in response to the query.

5. A method in accordance with claim 4 wherein the hand-held analyzer further includes a display for viewing information and data, interpreting the retrieved data comprising the step of viewing the brake system data received from the feed valve on the display.

6. A method in accordance with claim 5 wherein interpreting the retrieved data further comprises diagnosing the operational status of the brake system based on the brake system data received from the feed valve and view on the display.

7. A method in accordance with claim 6 wherein performing maintenance functions comprises implementing repair procedures to correct brake system malfunctions indicated by diagnosing the operation status of the brake system.

8. A method in accordance with claim 7 wherein the hand-held analyzer includes a second processor and a memory module, performing maintenance functions further comprising:

utilizing the user interface to input general information to the hand-held analyzer; and storing the general information and the brake system data in the memory module.

9. A method in accordance with claim 8 wherein performing maintenance functions further comprises downloading the stored general information and brake system data to the data unit.

10. A method in accordance with claim 9 wherein performing maintenance functions further comprises posting the downloaded general information and brake system data to web page.

11. A system for diagnosing a condition of a braking equipment for a railroad train comprising a plurality of rolling stock vehicles, wherein the braking equipment includes a brake pipe extending the length of the train, with a portion of the braking equipment being associated with each rolling stock vehicle, such portion comprising at least one brake pipe section connected to a reservoir of pressurized air, and at least one brake cylinder powered by air in the reservoir, and a radio transmitter/receiver equipped feed valve for controlling the flow of air from said reservoir into said brake cylinder on a plurality of said rolling stock vehicles, said system comprising:

a radio-based hand-held analyzer;

at least one radio-based transmitter/receiver on each radio equipped feed valve receiving data indicative of the operation of the braking equipment for transmitting data indicative of the operation of the portion of the braking equipment associated with each of the rolling stock vehicles, said transmitter/receiver configured to communicate with said hand-held analyzer; and at least one data unit configured to communicate with the hand-held analyzer.

12. A system in accordance with claim 11 wherein said hand-held analyzer configured to retrieve brake equipment data indicative of an operational state of at least one of the brake pipe section, the reservoir and the brake cylinder, from said feed valve.

13. A system in accordance with claim 12, said feed valve including a sensor for sensing air pressure in the brake pipe section, and a first processor for processing air pressure data, wherein to retrieve brake equipment data, said feed valve configured to:

utilize the sensor to measure air pressure in the brake pipe section; and utilize the first processor to compile brake equipment data indicative of an operational state of at least at least one of the brake pipe section, the reservoir and the brake cylinder.

14. A system in accordance with claim 13, said hand-held analyzer including a display for viewing information, and a user interface for inputting data and commands, wherein to retrieve brake equipment data, said hand-held analyzer configured to:

allow a user to input a command to query the feed valve, using the user interface; and communicate the query to said feed valve.

15. A system in accordance with claim 14 wherein said feed valve configured to communicate brake equipment data to said hand-held analyzer in response to the query, and said hand-held analyzer further configured to display the brake equipment data received from said feed valve, such that a user can diagnose the operational status of the brake equipment based on the data received and displayed.

16. A system in accordance with claim 15, wherein said hand-held analyzer further includes a second processor and a memory module, said hand-held analyzer further configured to:

compile the brake equipment data utilizing the second processor; and store the brake equipment data in the memory module.

17. A system in accordance with claim 16 wherein said hand-held analyzer further configured to:

receive general information input using the user interface; and store the general information in the memory module.

18. A system in accordance with claim 17 wherein said hand-held analyzer further configured to download the brake equipment data and the general information to said data unit.

19. A system in accordance with claim 18 wherein said data unit configured to post the brake equipment data and the general information on a web page.

20. A hand-held analyzer for testing and diagnosing a condition of a brake system for a railroad train comprising a plurality of rolling stock vehicles, the brake system including a brake pipe extending the length of said train, with a portion of the brake system being associated with each rolling stock vehicle, the portion comprising at least one brake pipe section, one reservoir, at least one brake cylinder powered by air in the reservoir, and a feed valve for controlling the flow of air from the reservoir into the brake cylinder on each rolling stock vehicle, and a radio-based transmitter/receiver on a plurality of feed valves receiving data indicative of the operation of the brake system for transmitting data indicative of the operation of the portion of the brake system associated with each respective rolling stock vehicle, said hand-held analyzer comprising a radio based hand-held transmitter/receiver having a processor for analyzing data, an antenna for communicating with the feed valve transmitter/receiver, a user interface for inputting data and commands to be communicated to the feed valve transmitter/receiver, and a display for viewing data received from the feed valve transmitter/receiver, said hand-held analyzer configured to:

utilize said user interface to input a command to query the feed valve transmitter/receiver for brake system data indicative of an operational state of said brake system;

transmit the query to the feed valve transmitter/receiver utilizing said antenna;

receive the brake system data from said feed valve transmitter/receiver via radio communications indicative of an operational state of the brake system utilizing said antenna; and display the brake system data on said display.

21. A hand-held analyzer in accordance with claim 20 further comprising a processor for executing functions of said hand-held analyzer and memory module for storing information and data, said hand-held analyzer further configured to:

receive general information input using said user interface;

compile the general information and brake system data utilizing said processor; and store the compiled general information and brake system data in said storage module.

22. A hand-held analyzer in accordance with claim 21 further configured to download the stored general information and brake system data to a data unit.

* * * * *